(No Model.)
P. LABERIE & A. BERTHET.
Fiber Extractor.
No. 240,029.                    Patented April 12, 1881.
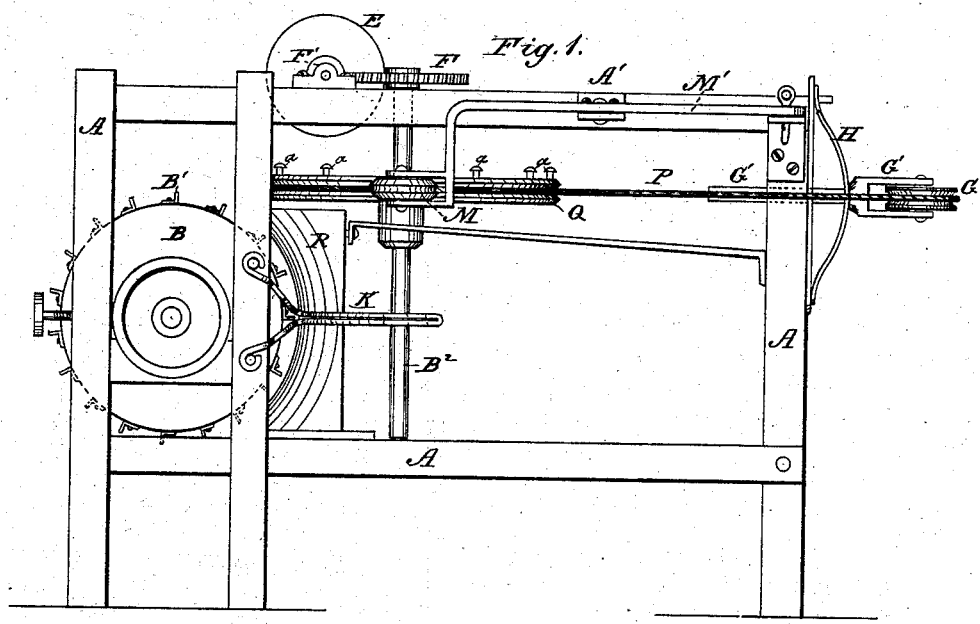
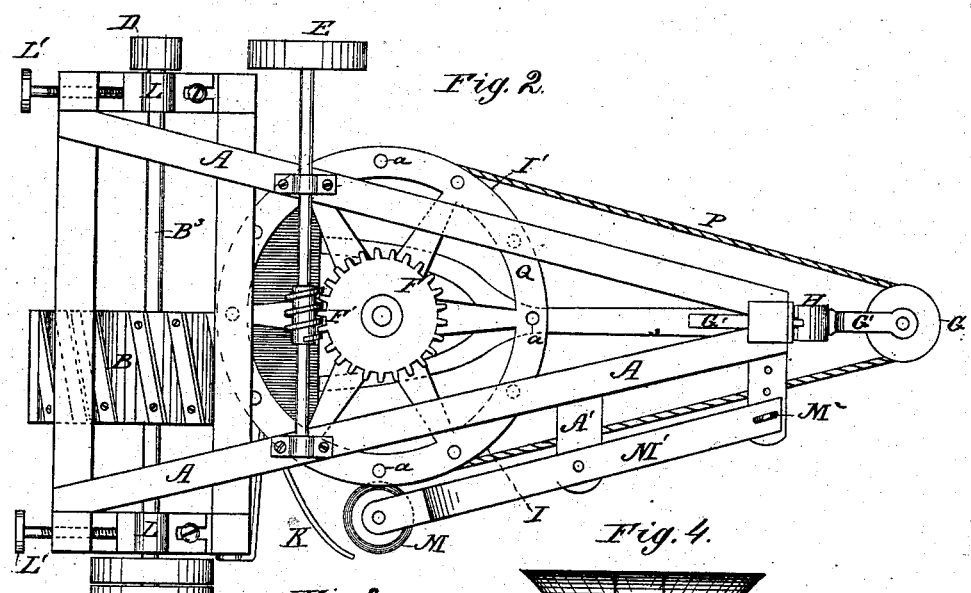
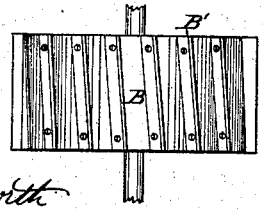
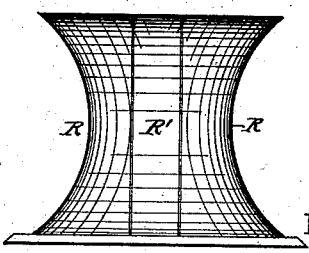
WITNESSES:
W. W. Hollingsworth
Edw. W. Byrn
INVENTOR:
P. Laberie
A. Berthet
BY
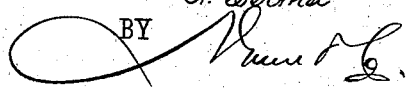
ATTORNEYS.

UNITED STATES PATENT OFFICE.

PIERRE LABERIE AND ANTOINE BERTHET, OF NEW ORLEANS, LOUISIANA.

FIBER-EXTRACTOR.

SPECIFICATION forming part of Letters Patent No. 240,029, dated April 12, 1881.

Application filed April 12, 1880. (No model.)

*To all whom it may concern:*

Be it known that we, PIERRE LABERIE and ANTOINE BERTHET, of New Orleans, parish of Orleans, in the State of Louisiana, have invented a new and Improved Fiber-Extractor; and we do hereby declare that the following is a full, clear, and exact description of the same, reference being had to the accompanying drawings, forming part of this specification, in which—

Figure 1 is a side elevation. Fig. 2 is a plan view. Fig. 3 is a detail plan of the stripping-cylinder detached. Fig. 4 is a detail face view of the concave bearing-surface.

The object of our invention is to provide an efficient machine for eliminating the fiber of Sisal grass from its leaves in its green state, which machine is also applicable in the extraction of fiber in many textile plants, especially in the class of the endogens.

The invention consists in a horizontal scraping-cylinder and a concave-block having a curve corresponding to the curve of the cylinder, in combination with a horizontal grooved wheel or pulley having a rope belt, between which and the pulley the bunches of grass are pinched and fed between the concave and scraping-cylinder.

The invention further consists in combining with the feeding-belt and pulley a presser-pulley arranged tangentially to the feed-pulley, to crush the rope or belt into the stalks and more securely hold the bunches of grass while being acted upon by the cylinder.

The invention also consists in other attachments and details of construction, as hereinafter fully described, and pointed out in the claims.

In the drawings, A represents the frame of the machine, which is of a triangular horizontal plan. At the wide end of the frame or base of the triangle is arranged the horizontal shaft $B^3$, carrying the scraping cylinder or drum B, armed with blunt diagonally-set knives B'.

R R' is a concave bearing-surface, between which and the drum the leaves are to be carried to be stripped of their skin and fleshy portions. This bearing-surface is made stationary on the frame-work, but in two parts, one of which, R', conforms to the curve of the scraping-cylinder, and is made detachable, so as to be capable of being renewed as often as it becomes worn away. The other portion, R, of the concave surface forms a tapering inlet and outlet between the same and the cylinder. The scraping-cylinder B is made capable of adjustment to or from this concave bearing-surface, according to the requirements of the case, by means of the movable boxes L and the set-screws L'.

On a vertical shaft, $B^2$, stepped in the frame-work just behind the concave, is mounted a horizontal pulley, Q, of relatively large diameter, having a grooved periphery. This pulley is slowly rotated by a worm-wheel, F, on the top of said shaft $B^2$ and a worm, F', on a horizontal shaft on the top of the frame-work, which latter is provided with a pulley, E, and is rotated through a belt by a pulley, D, on the cylinder-shaft below.

Around the grooved pulley Q passes a cord, P, which is distended by a tension-pulley, G, carried by a bifurcated slide-bar, G', which is projected outwardly by the curved metal spring H, in the place of which a rubber spring may be used, if desired.

In the operation of this machine the butt-ends of the leaves or bunches of grass or other fiber-bearing plant are inserted at the point I on the periphery of the wheel where the rope commences to bind tangentially against the large pulley Q. The bite of the rope then holds the leaves of grass against the pulley, and the bunches hanging down are carried around by the slow rotation of this pulley between the concave R R' and the scraping-cylinder B, the knives of which latter, acting upon the grasses, strip off therefrom the skin and fleshy portions and leave the fiber hanging to the pulley. Then, as the pulley continues to rotate, the fiber reaches the point I', where the rope departs at a tangent from the pulley, and, being released from the bite of the rope, drops down and away from the pulley to be further treated.

To cause the rope at the point I to crush the butts of the grass, and thus secure a hold sufficient to resist the stripping action of the cylinder, we employ a special bearing-surface to increase the pressure of the rope at this point, which consists of a grooved presser-pulley, M, mounted on the end of lever M' in the plane of the rope, which lever is fulcrumed horizontally to a support, A', of the main frame, and whose long end is held by a pin in any one of the holes of the bar M² to increase or diminish the pressure, as required.

K is a guard or guide arranged at the feed side of the machine, and which guard projects as shown, so as to guide the lower ends of the bunches of grass properly between the cylinder and the concave.

In the operation of this device, after the bunches of grass have been stripped of their fleshy portions there will still be a few inches of the butt-ends which, being near the rope, will not be stripped. To complete the work there are a set of hooks or knobs, $a$, fastened upon the top side of the pulley Q, near its periphery, to which the partially-stripped bunches of grass are attached by two or three turns of their fiber, each with their butt-ends hanging down. In this position the partially-stripped bunches are fastened to the feed side of the pulley Q and again subjected to the action of the stripping-cylinder, and then removed at the point I'.

Having thus described our invention, what we claim as new is—

1. The combination, with the horizontal feed-pulley and rope, of a scraping-cylinder, B, arranged on a horizontal axis and a concave bearing, R, substantially as described.

2. The combination, with the feed-pulley and rope-belt, of a presser roller or pulley, M, arranged tangentially to the feed-pulley to crush the rope into the stalks or bunches for a better hold, as described.

3. The concave bearing R R', made in two parts, with the point R' detachable, in combination with the stripping-cylinder, substantially as and for the purpose described.

4. The combination of the stripping-cylinder, the concave bearing, the feed-pulley, and the rope or belt with the bifurcated slide-bar G', carrying tension-pulley G, and the spring H for distending the rope, as described.

5. The combination of the triangular frame A, the stripping-cylinder B, arranged upon an axis at the base of the triangle, the concave bearing R R', and the horizontal feed-pulley Q and rope P, arranged to feed transversely to the stripping-cylinder, or at right angles to its plane of revolution, as described.

The above specification of our invention signed by us this 17th day of October, A. D. 1878.

P. LABERIE.
A. BERTHET.

Witnesses:
O. TUEJON,
J. NÉGRIER.